(12) United States Patent
Hinnerwisch et al.

(10) Patent No.: US 9,133,336 B2
(45) Date of Patent: Sep. 15, 2015

(54) LOW-EMISSION FIBRE-MATRIX MATERIAL CURABLE THERMALLY BY RADICAL POLYMERIZATION

(75) Inventors: Joerg Hinnerwisch, Hamburg (DE); Gerard Hubertus Louis Reestman, Weert (NL); Peter Walter Stannek, Oberhausen (DE); Michael Alfred Koska, Duisburg (DE); Klaus-W. Lienert, Hamburg (DE)

(73) Assignees: BYK-CHEMIE GMBH, Wesel (DE); ELANTAS GMBH, Wesel (DE)

( * ) Notice: Subject to any disclaimer, the term of this patent is extended or adjusted under 35 U.S.C. 154(b) by 0 days.

(21) Appl. No.: 14/114,583

(22) PCT Filed: Apr. 23, 2012

(86) PCT No.: PCT/EP2012/057339
§ 371 (c)(1), (2), (4) Date: Jan. 16, 2014

(87) PCT Pub. No.: WO2012/150138
PCT Pub. Date: Nov. 8, 2012

(65) Prior Publication Data
US 2014/0148531 A1  May 29, 2014

(30) Foreign Application Priority Data

May 2, 2011 (DE) .......................... 10 2011 050 035

(51) Int. Cl.
| | | |
|---|---|---|
| *C08K 3/40* | (2006.01) | |
| *C08L 67/06* | (2006.01) | |
| *C08K 5/00* | (2006.01) | |
| *C08K 7/02* | (2006.01) | |
| *C08J 5/24* | (2006.01) | |
| *C08K 7/14* | (2006.01) | |

(52) U.S. Cl.
CPC .. *C08L 67/06* (2013.01); *C08J 5/24* (2013.01); *C08K 5/0083* (2013.01); *C08K 7/02* (2013.01); *C08K 7/14* (2013.01); *C08K 2201/005* (2013.01)

(58) Field of Classification Search
CPC .............. C08J 5/24; C08L 67/06; C08K 7/02; C08K 7/14
USPC ............................................... 523/527
See application file for complete search history.

(56) References Cited

U.S. PATENT DOCUMENTS

| | | | |
|---|---|---|---|
| 3,313,864 A | 4/1967 | Rudolph et al. | |
| 4,330,283 A | 5/1982 | Michl et al. | |
| 4,806,603 A * | 2/1989 | Hess et al. ...................... | 525/445 |
| 5,364,914 A * | 11/1994 | Choate et al. .................. | 525/505 |
| 6,335,385 B2 | 1/2002 | Gorlich et al. | |
| 7,582,701 B2 * | 9/2009 | Goebelt et al. .................. | 525/88 |
| 2001/0021728 A1 | 9/2001 | Goerlich et al. | |
| 2008/0125565 A1 | 5/2008 | Handels et al. | |
| 2010/0151242 A1 * | 6/2010 | Boehm et al. .................. | 428/370 |
| 2012/0190787 A1 | 7/2012 | Lienert et al. | |

FOREIGN PATENT DOCUMENTS

| | | |
|---|---|---|
| DE | 2632294 A1 | 1/1978 |
| DE | 102009026185 A1 | 2/2011 |
| EP | 0033750 A1 | 8/1981 |
| EP | 1621567 A1 | 2/2006 |
| GB | 1041040 A | 9/1966 |
| JP | 62192453 | 8/1987 |
| WO | 03055946 A1 | 7/2003 |
| WO | 2009071670 A1 | 6/2009 |
| WO | 2011006798 A1 | 1/2011 |
| WO | 2011061910 A1 | 5/2011 |

* cited by examiner

*Primary Examiner* — Jane L Stanley
(74) *Attorney, Agent, or Firm* — Abel Law Group, LLP

(57) ABSTRACT

Fiber-matrix material curable thermally by radical polymerization, comprising (A) a polymeric matrix curable thermally by radical polymerization, (B) at least one kind of reinforcing fibers and (C) at least one particulate initiator of the radical polymerization, having an average particle size of 5 nm to 500 µm, as measured by static light scattering, and selected from the group consisting of benzpinacol and substituted benzpinacols; processes for producing it, and its use for producing fiber-reinforced thermoset moldings.

20 Claims, No Drawings

LOW-EMISSION FIBRE-MATRIX MATERIAL CURABLE THERMALLY BY RADICAL POLYMERIZATION

The present application claims the priority of DE 10 2011 050 035.9.

The priority document is incorporated by reference in its entirety into the present disclosure.

FIELD OF THE INVENTION

The present invention relates to a low-emission fibre-matrix material curable thermally by radical polymerization, more particularly a sheet moulding compound (SMC) or bulk moulding compound (BMC).

The present invention further relates to a process for producing a low-emission fibre-matrix material curable thermally by radical polymerization, more particularly an SMC or BMC.

The present invention relates not least to the use of the fibre-matrix material curable thermally by radical polymerization, more particularly of the SMC or BMC, for producing fibre-reinforced thermoset mouldings.

PUBLICATIONS CITED

All of the documents cited in the present application are by reference fully part of the disclosure content of the patent application, or are incorporated by reference in their entirety into the present disclosure.

DISCUSSION OF BACKGROUND INFORMATION

Fibre-matrix materials, more particularly SMCs and BMCs, are well known to the skilled person and are described in textbooks. (G. Erhard: Konstruieren mit Kunststoffen. Munich: Hanser-Verlag, 1993, ISBN 3-446-17397-8; M. Flemming, G. Ziegmann, S. Roth: Faserverbundbauweisen. Fertigungsverfahren: Fertigungsverfahren mit duroplastischer Matrix. Springer-Verlag, 1998, ISBN 3-540-61659-4).

In many cases the SMCs and BMCs comprise unsaturated polyester resins in styrene as a curable component. In order to reduce contraction in the course of curing, a shrinkage reducer additive or LP additive (low profile additive) is added. This additive is usually a saturated polyester. The materials further comprise fillers, an example being finely ground calcium carbonate. Magnesium oxide is used in order to control the rheology. Reinforcing fibres most often used are glass fibres. Various additives are employed for wetting and incorporating the fillers and the glass fibres. Materials are cured by addition of a peroxide. The BMCs are compression-moulded in complicated moulds. The SMCs are processed to form sheets. This is done in presses at e.g. 140° C.-160° C. in 1 to 5 minutes. The aim of the processing is to produce mouldings which do not comprise emissible chemicals, since in that event the mouldings are accompanied by an odour. The substances emitted are either residual styrene that has not been polymerized, or fragments formed as a result of decomposition of the peroxides.

Benzene is particularly critical in this respect. It is formed in the decomposition of tert-butyl perbenzoate. For this reason, SMCs and BMCs are frequently cured with percarbonates which contain no aromatic structures. One example of such is tert-butyl peroxy-2-ethylhexyl carbonate (Trigonox® 117, Akzo Nobel).

There has been no lack of attempts to eliminate the problems associated with the emission of chemicals.

Accordingly, international patent application WO 03/055946 describes the use of mixtures of peroxides which have their half-lives at 75-95° C. and at 105-125° C. This is said to lead to lower emissions and intrinsic odours on the part of the moulding materials. Nevertheless, it has not been possible by these means to eliminate the problems associated with the use of peroxides.

European patent application EP 1 621 567 describes the use of uretdione diisocyanates. For example, Desmodur TT is coupled by an isocyanate group to the LP additive. The other isocyanate group reacts with the emissions-relevant elimination products from the peroxides. Fundamentally, however, this measure does not alter the fact that emissions-relevant elimination products are initially produced, and then must subsequently be scavenged. It would be desirable, therefore, if such elimination products were not even produced.

DE 26 32 294 describes the preparation of various benzpinacol silyl ethers and the use thereof as initiators for radical polymerization. These initiators act similarly to peroxides, but do not have the hazard potential of the latter. Their activity as radical initiators derives from the homolytic scission of the extremely long tetraphenyl-substituted C—C single bond. In contrast to peroxides, the scission is endothermic and, in the absence of a monomer as reactant, is also reversible. However, these benzpinacol silyl ethers can be employed only in solutions. Using them in SMCs and BMCs, therefore, would result in emissions of volatile solvents.

Benzpinacol itself can also be used as a radical initiator for the polymerization of unsaturated polyester resins (Heinrich Wolfers et al. in Die Makromolekulare Chemie, 180, 3, pp. 649-655). Benzpinacol, however, is insoluble in styrene and styrenic unsaturated polyester resins. The use of benzpinacol as a radical initiator is described in DE 10 2009 026 185.

Also known, from European patent application EP 0 033 750, are radically polymerizable dental compositions which comprise benzpinacol as initiator. The cured dental compositions, however, have large, leaf-like blisters. Only 2,2'-dialkylbenzpinacols do not exhibit this disadvantage.

A disadvantage of customary SMCs/BMCs is that on account of the decomposition compounds emitted from the initiators, they have an unpleasant odour, thereby restricting their possibilities for use.

OBJECT OF THE PRESENT INVENTION

The object on which the present invention was based was that of providing new fibre-matrix materials curable thermally by radical polymerization, more particularly SMCs and BMCs, which no longer have the disadvantages of the prior art.

The new fibre-matrix materials curable thermally by radical polymerization, more particularly the new SMCs and BMCs, are intended more particularly to be able to be easily produced, stored, transported and processed. Above all, however, they are to be rapidly and reliably curable while emitting no chemicals, or only a toxicologically and environmentally unobjectionable amount of chemicals. In this way, they are to yield thermoset mouldings which are entirely or virtually odourless and have an outstanding technical performance profile, thus making them outstandingly suitable for producing motor-vehicle bodies, sports equipment and components for the electrical and sanitary industries, and also in the rail, marine travel, air travel and space travel industries.

ACHIEVEMENT ACCORDING TO THE INVENTION

Found accordingly has been the new fibre-matrix material curable thermally by radical polymerization, comprising
(A) a polymeric matrix curable thermally by radical polymerization,
(B) at least one kind of reinforcing fibres and
(C) at least one particulate initiator of the radical polymerization, having an average particle size of 5 nm to 500 µm, as measured by static light scattering, and selected from the group consisting of benzpinacol and substituted benzpinacols.

In the text below, the new fibre-matrix material curable thermally by radical polymerization is referred to as "material of the invention".

Additionally found has been the new process for producing the material of the invention, where the reinforcing fibres (B) and the particulate initiator (C) are incorporated into the polymeric matrix (A) curable thermally by radical polymerization, thus resulting in a fibre-matrix material having a solid or dough-like consistency.

In the text below, the new process for producing the material of the invention is referred to as "process of the invention".

Found not least has been the new use of the material of the invention and of the material of the invention produced by the process of the invention for producing fibre-reinforced thermoset mouldings.

In the text below, the new use is referred to as "use in accordance with the invention".

DEFINITIONS OF TERMS

In the context of the present invention, all quantity figures, unless otherwise indicated, should be understood as weight figures.

In the context of the present invention, the term "room temperature" means a temperature of 20° C. Temperature figures, unless indicated otherwise, are in degrees Celsius (° C.); unless indicated otherwise, the reactions and process steps referred to are carried out at room temperature.

Unless indicated otherwise, the reactions and process steps referred to are carried out under normal/atmospheric pressure, i.e. at 1013 mbar.

In the context of the present invention, the wording "and/or" includes not only any desired combination but also all combinations of the elements stated in the particular listing.

ADVANTAGES OF THE INVENTION

In the light of the prior art it was surprising and unforeseeable for the skilled person that the object on which the present invention was based could be achieved by means of the material of the invention, the process of the invention and the use in accordance with the invention.

Particularly surprising was that the materials of the invention, more particularly the SMCs and BMCs of the invention, no longer had the disadvantages of the prior art. They were able to be easily produced, stored, transported and processed. In particular, however, they were rapidly and reliably curable, emitting no chemicals, or only a toxicologically and environmentally unobjectionable amount of chemicals, during this curing. In this way they yielded fibre-reinforced thermoset mouldings which were entirely or virtually odourless and had an outstanding technical performance profile, thus making them outstandingly suitable for producing motor-vehicle bodies, sports equipment and components for the electrical and sanitary industries, and also in the rail, marine travel, air travel and space travel industries.

DETAILED DESCRIPTION OF THE INVENTION

The material of the invention comprises a polymeric matrix (A) curable thermally by radical polymerization.

The polymeric matrix (A) comprises at least one unsaturated resin (a1). Basically all unsaturated resins of the kind typically used for producing SMCs and BMCs are contemplated. The unsaturated resin (a1)) is preferably selected from the group consisting of unsaturated polyester resins and vinyl ester resins. As is known, these unsaturated resins (a1) are also referred to as UP resins.

The unsaturated resin (a1)) is more preferably selected from the group of the reactive resins based on unsaturated polyesters, consisting of co-condensed unsaturated dicarboxylic acids, such as maleic acid or fumaric acid, and primarily dihydric alcohols, such as ethylene glycol and propane-1,2-diol.

The amount of unsaturated resins (a1)) in the polymeric matrix (A) may vary widely and can therefore be adapted advantageously to the requirements of the particular material of the invention, the process of the invention and the use in accordance with the invention.

The polymeric matrix (A) further comprises at least one radically polymerizable monomer (a2). Basically all radically polymerizable monomers of the kind typically used in the field of SMCs and BMCs are contemplated.

The monomers (a2) are preferably selected from the group consisting of monofunctional and polyfunctional vinylaromatics, acrylates, methacrylates, vinyl ethers, vinyl esters, allyl ethers, and allyl esters. It is preferred to use mixtures of monofunctional and difunctional monomers (a2). The monomers (a2) are more preferably selected from the group of monofunctional and difunctional vinylaromatics. More particularly they are selected from the group consisting of styrene, alpha-methylstyrene, vinyltoluene and divinylbenzene.

The amount of monomers (a2) in the polymeric matrix (A) may vary widely and can therefore be adapted advantageously to the requirements of the particular material of the invention, the process of the invention and the use in accordance with the invention.

For the polymeric matrix (A) it is possible to use customary and known, commercially available products, such as Palapreg® 17 or 18 or Synolite® 0423.

The amount of polymeric matrix (A) in the material of the invention may vary widely and can therefore be adapted advantageously to the requirements of the respective material of the invention, the respective process of the invention and the use in accordance with the invention. The material of the invention, based in each case on its total amount, preferably contains 10% to 50% by weight, more preferably 10% to 40% by weight, very preferably 10% to 30% by weight and more particularly 10% to 25% by weight of the polymeric matrix (A).

The material of the invention comprises at least one, more particularly one, kind of reinforcing fibres (B).

The reinforcing fibres (B) are preferably selected from the group consisting of glass fibres, carbon fibres, metal fibres and aramid fibres. Glass fibres are used more particularly.

Where the material of the invention is used as an SMC, the reinforcing fibres may be in mat form or woven-fabric form. The typical fibre length is 25 to 50 mm. In the case of its use as a BMC, the fibre lengths used are shorter.

The amount of reinforcing fibres (B) in the material of the invention may likewise vary widely and can therefore be adapted advantageously to the requirements of the respective material of the invention, the process of the invention and the use in accordance with the invention. Based on the total amount of the material of the invention, the amount is preferably 15% to 50% by weight, more preferably 15% to 40% by weight and more particularly 20% to 35% by weight.

The material of the invention comprises at least one, more particularly one, particulate initiator (C) of radical polymerization.

The average particle size of the particulate initiator (C) lies between 5 nm to 500 μm, as measured by static light scattering, preferably between 5 nm and 400 μm and more particularly 5 nm to 350 μm. The particle size distribution may be monomodal, bimodal or multimodal and may also be broad or narrow.

The particulate initiator (C) is selected from the group consisting of benzpinacol and substituted benzpinacols.

Examples of suitable substituted benzpinacols are dialkylbenzpinacols, preferably 2,2'-dialkylbenzpinacols, in which the alkyl groups have 1 to 6 carbon atoms and more particularly are methyl groups, p,p'-diarylbenzpinacols, in which the aryl groups are more particularly phenyl groups, 2,2'-dichlorobenzpinacol, 2,2'-dibromobenzpinacol and 2,2'-dicyanobenzpinacol.

The particulate initiator (C) is preferably selected from the group consisting of benzpinacol, 2,2'-dialkylbenzpinacols, in which the alkyl groups have 1 to 6 carbon atoms and more particularly are methyl groups, p,p'-diarylbenzpinacols, in which the aryl groups are more particularly phenyl groups, 2,2'-dichlorobenzpinacol, 2,2'-dibromobenzpinacol, and 2,2'-dicyanobenzpinacol, or the particulate initiator (C) is selected from the group consisting of benzpinacol, 2,2'-dialkylbenzpinacols, in which the alkyl groups have 1 to 6 carbon atoms and more particularly are methyl groups, p,p'-diarylbenzpinacols, in which the aryl groups are more particularly phenyl groups, 2,2'-dichlorobenzpinacol, 2,2'-dibromobenzpinacol, 2,2'-dicyanobenzpinacol and mixtures thereof.

More particularly, benzpinacol is used.

The amount of pulverulent initiator (C) in the material of the invention may likewise vary widely and can therefore be adapted advantageously to the requirements of the respective material of the invention, the process of the invention and the use in accordance with the invention. Based in each case on the total amount of the material of the invention, the amount is preferably between 0.1% and 6% by weight, preferably between 0.3% and 5% by weight and more particularly between 0.4% and 4% by weight.

In one variant of the present invention, the new fibre-matrix material curable thermally by radical polymerization consists of the components (A), (B) and (C).

The material of the invention may comprise at least one functional additive (D). Functional additives (D) contemplated include all additives of the kind typically used for producing SMCs and BMCs. The functional additive (D) is preferably selected from the group consisting of fillers, shrinkage reducer additives, inhibitors, release agents, dispersants for fillers such as, for example, Byk W-9010, thickeners, flow agents, dyes, pigments, antistats, radical polymerization initiators other than the initiators (C), flame retardants and mixtures thereof. The functional additive (D) is more preferably selected from the group consisting of fillers, shrinkage reducer additives, radical polymerization initiators other than the initiators (C) and mixtures thereof.

Examples of suitable fillers (D) are calcium carbonate, calcium sulphate or rock flour.

Examples of suitable release agents (D) are zinc stearate or calcium stearate.

Examples of suitable thickeners (D) are magnesium oxide, magnesium hydroxide, calcium hydroxide or calcium oxide.

Examples of suitable shrinkage reducer additives or LP additives (D) are known from international patent application WO 03/055946, page 4, lines 24 to 30.

Examples of suitable radical polymerization initiators (D) other than the initiators (C), for the thermal curing, are the peroxides known from international patent application WO 03/055946, page 5, line 8 to page 6, line 2.

Generally speaking, the functional additives (D) are used in the amounts customary and known for SMCs and BMCs, generally up to 69% by weight. In particular, the fillers (D) are used in an amount of 20% to 60% by weight, preferably 25% to 55% by weight and more particularly 30% to 50% by weight, based in each case on the total amount of the material of the invention.

In one variant of the present invention, the new fibre-matrix material curable thermally by radical polymerization consists of the components (A), (B), (C) and (D).

The material of the invention is preferably produced by means of the process of the invention.

In the process of the invention, the reinforcing fibres (B) and the pulverulent initiator (C) and also, optionally, at least one functional additive (D) are incorporated into the polymeric matrix (A) curable thermally by radical polymerization, thus resulting in a fibre-matrix material having a solid or dough-like consistency. For this purpose it is possible to use customary and known mixing methods and apparatus such as casting apparatus, compounders and extruders, and SMC units.

The SMCs of the invention are obtained as mats, whereas the BMCs of the invention may have any desired shape.

In the context of the use in accordance with the invention, the material of the invention, more particularly SMCs and BMCs of the invention, serves for producing fibre-reinforced thermoset mouldings.

The fibre-reinforced thermoset mouldings of the invention in turn may be put to numerous end uses. They are preferably used for producing motor-vehicle bodies, components for the interior of cars and lorries, sports equipment and components for the electrical and sanitary industries, and also in the rail, marine travel, air travel and space travel industries.

One advantage of the fibre-reinforced thermoset mouldings of the invention is that they do not give off any unpleasantly odorous decomposition products and hence their field of use is not restricted as a result of odour nuisance.

One variant according to the invention is the use of the fibre-reinforced thermoset mouldings of the invention for producing/as components for the interior of cars and lorries.

For the production of the fibre-reinforced thermoset mouldings of the invention, the material of the invention, more particularly the SMCs and BMCs of the invention, is compression-moulded in a customary and known way at temperatures between 100 and 200° C., preferably between 140 and 170° C., in the course of which it is cured. The curing time is preferably 0.1 to 60 minutes, more preferably 0.5 to 10 minutes and more particularly 1 to 5 minutes. The fibre-reinforced thermoset mouldings of the invention, after they have been produced, are preferably heat-treated for preferably 10 to 60 minutes, more preferably 15 to 40 minutes and more particularly 30 minutes. The heat treatment takes place preferably between 120 and 250° C., more preferably between 150 and 220° C., very preferably between 160 and 200° C. This once again significantly reduces the emission of chemicals.

One variant of the present invention is a fibre-matrix material curable thermally by radical polymerization and consisting of
(A) 10% to 50% by weight of a polymeric matrix curable thermally by radical polymerization,
(B) 15% to 50% by weight of at least one kind of reinforcing fibres,
(C) 0.1% to 6% by weight of at least one particulate radical polymerization initiator, having an average particle size of 5 nm to 500 µm, as measured by static light scattering, and selected from the group consisting of benzpinacol and substituted benzpinacols, and
(D) 0% to 69% by weight of functional additive, the quantity figures being based in each case on the total amount of the material of the invention, and together making 100% by weight.

Likewise provided by the present invention are mouldings produced from a fibre-matrix material of the invention.

The different embodiments of the present invention, exemplified by, but not exclusively, those embodiments of the various dependent claims, may be combined with one another in any desired way.

The invention is set out below by means of examples. The examples therefore serve for further illustration of the invention, and do not constitute any restriction at all.

EXAMPLES AND COMPARATIVE EXAMPLE

Comparative Example

Preparation and Properties of an SMC with Peroxide Initiator

From 700 g of UP resin (Palapreg® P18-03/DSM), 300 g of LP additive (Palapreg® H 2681-01), 15 g of Trigonox 117® (tert-butyl peroxy-2-ethylhexyl carbonate/Akzo Nobel), 20 g of dispersing additive for filler (Byk® W-9010), 2100 g of calcium carbonate (Millicarb OG/Omya®), and 26 g of magnesium oxide paste (MK 35/Lehmann&Voss®), a paste was produced. Incorporated thereafter into the compound was 28% of glass fibres (P204, 2400 tex/Vetrotex®/OCV).

The SMC compound was compression-moulded at 155° C. for 3 minutes. The cured, compression-moulded compound had a uniformly smooth surface.

Analysis in accordance with VDA 277 revealed the following emissions:

Total emission: 560 µg C/g; of which 12.5% acetone, 44.4% tert-butanol, 0.6% benzene, 0.1% styrene, 20.6% 2-ethylhexanol.

The emissions were therefore significantly higher than for the SMCs of Examples 1 to 3.

Example 1

Preparation and Properties of an SMC with a Mixture of Peroxide Initiator and Benzpinacol From 700 g of UP resin (Palapreg® P18-03/DSM), 300 g of LP additive (Palapreg® H 2681-01), 5 g of Trigonox 117® (tert-butyl peroxy-2-ethylhexyl carbonate/Akzo Nobel), 7.5 g of benzpinacol, 20 g of dispersing additive for filler (Byk® W-9010), 2100 g of calcium carbonate (Millicarb OG/Omya®), and 26 g of magnesium oxide paste (MK 35/Lehmann&Voss®), a paste was produced. Incorporated thereafter into the compound was 28% of glass fibres (P204, 2400 tex/Vetrotex®/OCV).

The SMC compound was compression-moulded at 155° C. for 3 minutes.

The cured, compression-moulded compound had a uniformly smooth surface of high quality.

Analysis in accordance with VDA 277 revealed the following emissions:

Total emission: 220 µg C/g; of which 7.1% acetone, 30.7% tert-butanol, 0.8% benzene, 0.5% styrene, 24.9% 2-ethylhexanol.

Example 2

Preparation and Properties of an SMC with Benzpinacol as Initiator

From 700 g of UP resin (Palapreg® P18-03/DSM), 300 g of LP additive (Palapreg® H 2681-01), 20 g of benzpinacol, 20 g of dispersing additive for filler (Byk® W-9010), 2100 g of calcium carbonate (Millicarb OG/Omya®), and 26 g of magnesium oxide paste (MK 35/Lehmann&Voss®), a paste was produced. Incorporated thereafter into the compound was 28% of glass fibres (P204, 2400 tex/Vetrotex®/OCV).

The SMC compound was compression-moulded at 160° C. for 3 minutes.

The cured, compression-moulded compound had a uniformly smooth surface of high quality.

Analysis in accordance with VDA 277 revealed the following emissions:

Total emission: 80 µg C/g; of which 6.1% acetone, 2.9% tert-butanol, 1.3% benzene, 0.3% styrene, 5% 2-ethylhexanol.

Example 3

The product from Example 2, after being compression-moulded, was heat-treated at 180° C. for 30 minutes.

Analysis in accordance with VDA 277 revealed the following emissions:

Total emission: 41 µg C/g; of which 9.8% acetone, 0.9% tert-butanol, 0.9% benzene, 1% styrene, 6% 2-ethylhexanol.

What is claimed is:

1. A process for producing a low-emission fiber-reinforced thermoset molding, wherein the process comprises combining
(A) a polymeric matrix that is curable thermally by radical polymerization with
(B) at least one kind of reinforcing fibers, and
(C) at least one particulate radical polymerization initiator selected from benzpinacol and substituted benzpinacols and having an average particle size of from 5 nm to 500 µm, as measured by static light scattering,
and subjecting a resultant fiber matrix material that is curable thermally by radical polymerization to compression-molding.

2. The process of claim 1, wherein (A) comprises at least one unsaturated resin (a1) and at least one radically polymerizable monomer (a2).

3. The process of claim 2, wherein the at least one unsaturated resin (a1) is selected from unsaturated polyester resins and vinyl ester resins.

4. The process of claim 2, wherein the at least one radically polymerizable monomer (a2) is selected from monofunctional and polyfunctional vinylaromatics, acrylates, methacrylates, vinyl ethers, vinyl esters, allyl ethers, and allyl esters.

5. The process of claim 1, wherein the reinforcing fibers (B) are selected from glass fibres, carbon fibers, metal fibers, aramid fibers, natural fibers, and mixtures thereof.

6. The process of claim 1, wherein the average particle size of (C) is from 5 nm to 400 µm.

7. The process of claim 1, wherein the fiber-matrix material comprises from 0.1% to 6% by weight of (C), based on a total amount of the fiber-matrix material.

8. The process of claim 1, wherein (C) is selected from benzpinacol, 2,2'-dialkylbenzpinacols, p,p'-diarylbenzpinacols, 2,2'-dichlorobenzpinacol, 2,2'-dibromobenzpinacol, and 2,2'dicyanobenzpinacol.

9. The process of claim 1, wherein the fiber-matrix material further comprises at least one functional additive (D) selected from fillers, shrinkage reducer additives, inhibitors, release agents, dispersants, thickeners, flow agents, dyes, pigments, antistats, radical polymerization initiators other than the initiators (C), flame retardants, and mixtures thereof.

10. The process of claim 8, wherein the fiber-matrix material is a sheet molding compound (SMC).

11. The process of claim 8, wherein the fiber-matrix material is a bulk molding compound (BMC).

12. The process of claim 8, wherein the fiber-reinforced thermoset molding is suitable and adapted for use in a production of a motor-vehicle body, an automotive interior component, sports equipment, or as a component for electrical, sanitary, rail, marine travel, air travel, and space travel industries.

13. A process for producing a low-emission fiber-reinforced thermoset molding, wherein the process comprises combining
   (A) a polymeric matrix that is curable thermally by radical polymerization and comprises at least one unsaturated resin selected from unsaturated polyester resins and vinyl ester resins and at least one radically polymerizable monomer selected from monofunctional and polyfunctional vinylaromatics, acrylates, methacrylates, vinyl ethers, vinyl esters, allyl ethers, and allyl esters, with
   (B) at least one kind of reinforcing fibers selected from glass fibers, carbon fibers, metal fibers, aramid fibers, natural fibers, and mixtures thereof, and
   (C) at least one particulate radical polymerization initiator selected from benzpinacol, 2,2'-dialkylbenzpinacols, p,p'-diarylbenzpinacols, 2,2'-dichlorobenzpinacol, 2,2'-dibromobenzpinacol, and 2,2'dicyanobenzpinacol and having an average particle size of from 5 nm to 400 µm, as measured by static light scattering, and subjecting a resultant fiber matrix material that is curable thermally by radical polymerization to compression-molding.

14. The process of claim 13, wherein the average particle size of (C) is from 5 nm to 350 µm.

15. The process of claim 14, wherein the fiber-matrix material comprises from 0.4% to 4% by weight of (C), based on a total amount of the fiber-matrix material.

16. The process of claim 15, wherein (C) comprises benzpinacol.

17. The process of claim 13, wherein the fiber-matrix material further comprises at least one functional additive selected from fillers, shrinkage reducer additives, inhibitors, release agents, dispersants, thickeners, flow agents, dyes, pigments, antistats, radical polymerization initiators other than the initiators (C), flame retardants, and mixtures thereof.

18. The process of claim 13, wherein the fiber-matrix material is a sheet molding compound (SMC).

19. The process of claim 13, wherein the fiber-matrix material is a bulk molding compound (BMC).

20. A process for producing a low-emission fiber-reinforced thermoset molding, wherein the process comprises combining
   (A) a polymeric matrix that is curable thermally by radical polymerization and comprises at least one unsaturated resin selected from unsaturated polyester resins and vinyl ester resins and at least one radically polymerizable monomer selected from monofunctional and polyfunctional vinylaromatics, acrylates, methacrylates, vinyl ethers, vinyl esters, allyl ethers, and allyl esters, with
   (B) at least one kind of reinforcing fibers selected from glass fibers, carbon fibers, metal fibers, aramid fibers, natural fibers, and mixtures thereof, and
   (C) benzpinacol having an average particle size of from 5 nm to 350 µm, as measured by static light scattering, and subjecting a resultant fiber matrix material in the form of a sheet molding compound (SMC) that is curable thermally by radical polymerization to compression-molding.

\* \* \* \* \*